US007961452B2

(12) United States Patent
Oi et al.

(10) Patent No.: US 7,961,452 B2
(45) Date of Patent: Jun. 14, 2011

(54) SEMICONDUCTOR PHOTOELECTRODE, METHOD FOR MANUFACTURING THE SAME, AND LIGHT ENERGY CONVERTING DEVICE

(75) Inventors: Takashi Oi, Matsudo (JP); Yasukazu Iwasaki, Yokohama (JP); Kazuhiro Sayama, Tsukuba (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 876 days.

(21) Appl. No.: 11/911,977

(22) PCT Filed: Mar. 29, 2006

(86) PCT No.: PCT/JP2006/306465
§ 371 (c)(1),
(2), (4) Date: Oct. 19, 2007

(87) PCT Pub. No.: WO2006/114972
PCT Pub. Date: Nov. 2, 2006

(65) Prior Publication Data
US 2009/0060804 A1 Mar. 5, 2009

(30) Foreign Application Priority Data
Apr. 21, 2005 (JP) ................... 2005-123629

(51) Int. Cl.
*H01L 31/0236* (2006.01)
*H01L 31/18* (2006.01)
*H01L 31/20* (2006.01)

(52) U.S. Cl. ........ 361/256; 361/252; 361/291; 429/111; 204/290.01; 204/290.12; 204/290.13

(58) Field of Classification Search ............. 429/111; 136/291, 252, 256, 263; 204/290.01, 290.12, 204/290.13
See application file for complete search history.

(56) References Cited

U.S. PATENT DOCUMENTS

| 4,181,754 A * | 1/1980 | McKinzie et al. ............. 427/74 |
| 5,136,351 A | 8/1992 | Inoue et al. |
| 5,282,902 A | 2/1994 | Matsuyama |
| 5,695,890 A | 12/1997 | Thompson et al. |
| 2004/0262154 A1 | 12/2004 | Gibson et al. |

FOREIGN PATENT DOCUMENTS

| JP | 8-296077 A | 11/1996 |
| JP | 2003-146602 A | 5/2003 |
| JP | 2003-275602 A | 9/2003 |
| JP | 2004-41905 A | 2/2004 |
| JP | 2004-204328 A | 7/2004 |
| JP | 2004-243287 A | 9/2004 |
| WO | WO 2004/066354 A2 | 8/2004 |

OTHER PUBLICATIONS

Akira Fujishima et al., "Electrochemical Photolysis of Water at a Semiconductor Electrode", Nature vol. 238, Jul. 7, 1972, pp. 37-38.

(Continued)

*Primary Examiner* — Bruce F Bell
(74) *Attorney, Agent, or Firm* — Foley & Lardner LLP

(57) ABSTRACT

The semiconductor photoelectrode of the present invention includes a metallic substrate having irregularities in a surface and a semiconductor layer which is formed on the surface of the metallic substrate and composed of a photocatalytic material. This can increase the light absorption efficiency and, furthermore, prevent recombination of charges.

20 Claims, 7 Drawing Sheets

OTHER PUBLICATIONS

Axel Wahl et al., "Charge Carrier Transport in Nanostructured Anatase $TiO_2$ Films Assisted by the Self-Doping of Nanoparticles", J. Phys. Chem. B, vol. 102, No. 40, 1998, pp. 7820-7828.

Sven Södergren et al., "Theoretical Models for the Action Spectrum and the Current-Voltage Characteristics of Microporous Semiconductor Films in Photoelectrochemical Cells", J. Phys. Chem, vol. 98, No. 21, 1994, pp. 5552-5556.

\* cited by examiner (a)

(b)

SEMICONDUCTOR PHOTOELECTRODE, METHOD FOR MANUFACTURING THE SAME, AND LIGHT ENERGY CONVERTING DEVICE

TECHNICAL FIELD

The present invention relates to a semiconductor photoelectrode applied to a hydrogen production apparatus which splits water by light energy to produce hydrogen, a method for manufacturing the semiconductor photoelectrode, and a light energy converting device employing the semiconductor photoelectrode.

BACKGROUND ART

For efficient use of solar energy, many developments are being conducted in technologies to convert the solar energy into a form which can be easily used and then store the same. One typical example thereof is a solar battery. However, the solar battery has not spread because of high cost thereof, and there is a demand for development of a cheaper system.

Accordingly, studies are being conducted in technologies to convert light energy to chemical energy using photocatalysts. When being irradiated by solar energy, the photocatalysts absorb the light energy to generate electrons and holes and cause a chemical reaction. Among the photocatalysts, especially in titanium dioxide (TiO2), the valence band is located deep, and oxidizing power of generated holes thereof is stronger than that of chlorine or ozone. Accordingly, a method of splitting water using a semiconductor photoelectrode made of $TiO_2$ has been studied (see A. Fujishima and K. Honda, Nature, 238(5358), 37 (1972)).

For the conventional semiconductor photoelectrodes, $TiO_2$ single crystals or $TiO_2$ sintered pellets obtained by sintering and pelletizing $TiO_2$ powder were used. However, use of the $TiO_2$ single-crystals increased the manufacturing cost, and use of the $TiO_2$ sintered pellets reduced the photoelectric conversion efficiency.

In recent years, therefore, a semiconductor photoelectrode was disclosed in which a semiconductor layer was formed on a substrate composed of conductive glass or smooth metal (see J. Phys. Chem., 102 (1998) 7820 and J. Phys. Chem., 98 (1994) 5552). However, use of the conductive glass for the substrate increased the cost and moreover might degrade adhesiveness and stability of the interface between the substrate and semiconductor layer. Accordingly, a semiconductor photoelectrode including a metallic substrate as the substrate is being developed.

FIG. 11 shows a semiconductor photoelectrode 40 including a titanium plate (Ti plate) as the substrate. In the semiconductor photoelectrode 40, a Ti plate is baked to form a $TiO_2$ layer on the Ti plate, thus forming a semiconductor layer ($TiO_2$ layer) 42 on a substrate 41. Baking the Ti plate to form the semiconductor layer ($TiO_2$ layer) 42 on the surface thereof in such a manner reduces the manufacturing cost. Moreover, there is an advantage of obtaining a flexible semiconductor photoelectrode.

DISCLOSURE OF INVENTION

However, the photoelectric conversion efficiency of the semiconductor photoelectrode including the conventional metallic substrate is not so high. Accordingly, a semiconductor photoelectrode was developed whose photoelectric conversion efficiency was increased by making the semiconductor layer ($TiO_2$) 42 thick to increase the light absorption efficiency.

However, making the semiconductor layer 42 thick increased travel distances of electric charges in the semiconductor layer 42 and might increase proportions of recombined electrons and holes in generated electrons and holes. Moreover, since the electric charges moved slowly in the semiconductor layer 42, the increase in travel distances of the electric charges caused reduction of the photoelectric conversion efficiency. Furthermore, as shown in FIG. 11, since the surface of the conventional semiconductor photoelectrode 40 was flat, reflection of incident light thereon reduced the light absorption efficiency.

The present invention was made to solve the aforementioned problems, and an object thereof is to provide a semiconductor photoelectrode in which the light absorption efficiency is increased and the recombination of electric charges is prevented, a method for manufacturing the same, and a light energy converting device with a photoelectric efficiency increased.

A semiconductor photoelectrode according to a first aspect of the present invention includes a metallic substrate having irregularities in a surface; and a semiconductor layer which is formed on the surface of the metallic substrate and made of a photocatalytic material.

A method for manufacturing a semiconductor photoelectrode according to a second aspect of the present invention includes the steps of: producing a metallic substrate having irregularities in a surface thereof; and producing a semiconductor layer composed of a photocatalytic material in the surface of the metallic substrate.

BRIEF DESCRIPTION OF THE DRAWINGS

FIG. 7(b) being an A-A' cross-sectional view of the Ti plate shown in FIG. 7(a).

BEST MODE FOR CARRYING OUT THE INVENTION

A description is given of a semiconductor photoelectrode according to an embodiment of the present invention, a method for manufacturing the same, and a light energy converting device including the same.
(Semiconductor Photoelectrode)

Figure 1:
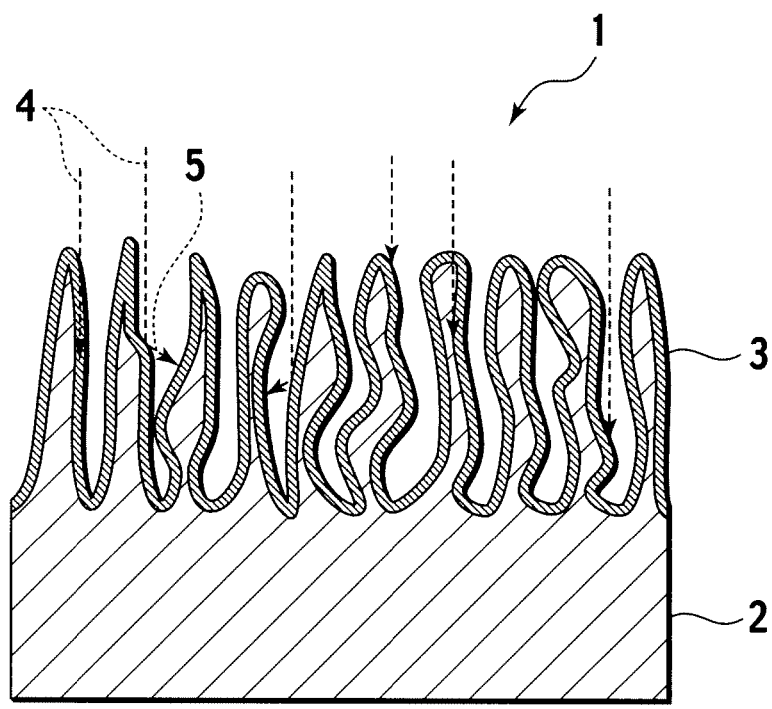
FIG. 1 is an enlarged cross-sectional view showing a semiconductor photoelectrode according to an embodiment of the present invention.

FIG. 1 shows a surface state of a semiconductor photoelectrode 1 according to the embodiment of the present invention. The semiconductor photoelectrode 1 includes a metallic substrate 2 which is configured to have a high surface area by forming irregularities in the surface thereof and a semiconductor layer 3 formed on the surface of the metallic substrate 2.

Preferably, the irregularities of the surface of the metallic substrate 2 are formed as evenly as possible so that valleys are deep. Specifically, the arithmetic average roughness (Ra) of the surface of the metallic substrate 2 is preferably 1 to 4 µm. This is because with such a range of arithmetic average roughness, a higher photocurrent value can be obtained. The arithmetic average roughness (Ra) of the surface of the metallic substrate 2 is calculated by the following equation using a roughness meter (Alpha-Step made by KLA-Tencor Corporation). In Equation 1, l indicates a reference length, and f(x) indicates a curve along the roughness profile of the surface of the metallic substrate 2.

$$Ra = \frac{1}{l}\int_0^l |f(x)|dx$$ [Math. 1]

A maximum height (Ry) is, preferably, 1 to 500 µm and, more preferably, 3 to 200 µm. Herein, the maximum height (Ry) means a sum (x+y) of a distance (x) between a mean line of the roughness profile and a highest peak portion and a distance (y) between the mean line of the roughness profile and a lowest valley portion. In this specification, the arithmetic average roughness (Ra) and maximum height (Ry) are calculated according to JIS B0601 (ISO 4287).

Figure 2:
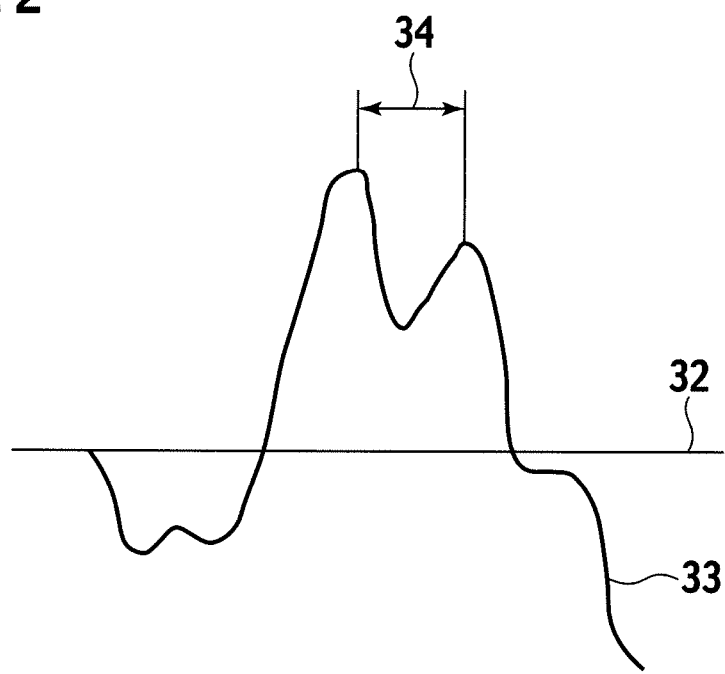
FIG. 2 is a view for explaining roughness spacing.

Moreover, it is desirable that the roughness spacing is not more than 500 µm and is as small as possible. Herein, the roughness spacing is, as shown in FIG. 2, spacing 34 between adjacent peaks in a surface roughness curve 33. Reference numeral 32 in FIG. 2 indicates the mean line.

The metallic substrate 2 can be made of only a single element or a compound of the element (an oxide, nitride, boride, oxynitride, sulfide, oxysulfide, or the like). These materials can exhibit photocatalytic characteristics or photoelectrode characteristics. Specifically, the metallic substrate is preferably made of at least one element selected from Ti, Nb, Ta, W, V, Co, Fe, Ni, and In or a compound thereof.

The semiconductor layer 3 can be made of a photocatalytic material. Specifically, examples thereof are $TiO_2$, $Nb_2O_5$, $Ta_2O_5$, $WO_3$, $V_2O_5$, $InCuTaO_4$, $InNiTaO_4$, $InCoTaO_4$, $InFeTaO_4$, $InMnTa_4$, $InTaO_4$, $InNbTaO_4$, $SrTiO_3$, TaON, and $TiO_2$:N (nitrogen-doped titanium), but the material of the semiconductor layer 3 is not limited to the examples. The material of the semiconductor layer 3 may be different from the compound of the metal constituting the metallic substrate 2.

The thickness of the semiconductor layer 3 is preferably 0.1 to 1 µm. When the thickness of the semiconductor layer 3 is less than 0.1 µm, which is too thin, the light absorption efficiency is reduced. On the contrary, when the thickness thereof exceeds 1 µm, the travel distance of electric charges becomes long. Accordingly, the movement of electric charges takes a long time, or electric charges can recombine.

By forming irregularities in the surface of the semiconductor photoelectrode 1 in the above-described manner, the semiconductor layer 3 can absorb not only the incident light 4 but also scattered light 5. Accordingly, even if the thickness of the semiconductor layer 3 is made small, the light absorption efficiency is not reduced. Moreover, when the thickness of the semiconductor layer 3 is made thin, the travel distance of electric charges is short, and electric charges immediately reach the metallic substrate 2. The electric charges move in the metal substrate 2 at high speed since the metallic substrate 2 has low resistance. Moreover, compared to the conventional electrodes, the semiconductor layer 3 has larger substantial surface area, so that the charge density thereof can be lower. Accordingly, recombination of electric charges in the semiconductor layer 3 can be prevented.

(Semiconductor Photoelectrode Manufacturing Method)

Next, a description is given of a method for manufacturing the semiconductor photoelectrode according to the embodiment of the present invention.

First, the metallic substrate 2 having irregularities in the surface is produced. The method of forming the irregularities can be a method of mechanically polishing a metallic substrate and then conducting chemical etching. At this time, the maximum height (Ry) is preferably, 1 to 500 µm and, more preferably, 3 to 200 µm. It is preferable that the roughness spacing is made small, which is not more than 500 µm. As another method of forming the irregularities, the metallic plate may be roughly ground by abrasive paper and the like.

Figure 3:
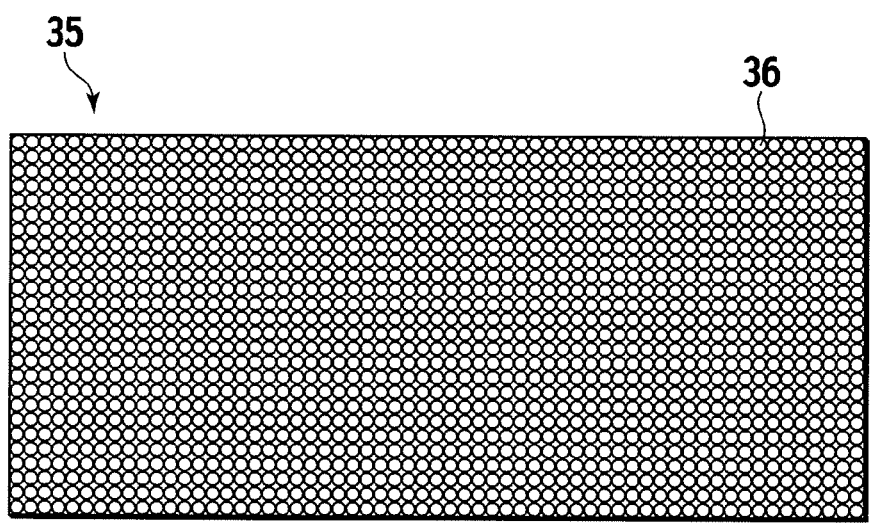
FIG. 3 is a plan view showing a metallic substrate used in the semiconductor photoelectrode.

As shown in FIG. 3, the metallic substrate 2 may be made of a porous body having irregularities in the surface, which is formed by bonding metallic particles 36 by pressure or heat. Particle size (D50) of the metallic particles 36 used at this time is preferably, 1 to 400 µm and, more preferably, 3 to 200 µm. Preferably, pressure and heat for bonding are varied depending on the type and particle size of the metallic particles. By bonding the metallic particles by pressure or heat in such a manner, growth of necking proceeds in interfaces between the metallic particles to improve the electric contact, thus obtaining a metallic substrate 35 more excellent in mechanical strength. In the metallic substrate 35 of FIG. 3, the metallic particles 36 are arranged in an orderly manner both horizontally and vertically. However, the metallic substrate of the present invention is not limited to the aforementioned substrate and can be any porous material which is composed of metallic particles bonded by pressure or heat.

As a measure of particle size, there is a particle size distribution obtained by measuring a distribution (ranges and contents) of particle size. The particle size distribution is generally measured by preparing several sieves having openings of different sizes and measuring proportions of particles passing the openings, which are expressed in (integrated) weight percentage. The particle size of the metallic particles used in the present invention is several microns and therefore measured using a general particle size distribution meter. The particle size corresponding to an integrated percentage of 50% is defined as "particle size (D50)".

Next, the semiconductor layer 3 is formed on the obtained metallic substrate 2. The method for manufacturing the semiconductor layer 3 varies depending on the raw material used for the semiconductor layer 3.

When the semiconductor layer 3 is made of a simple oxide, a metallic plate made of simple metal is baked or electrolytically oxidized in an oxidative atmosphere (in air or oxygen).

When the semiconductor layer 3 is made of a nitride or sulfide of simple metal, a metallic substrate made of simple metal is heated or treated with plasma in a non-oxidative atmosphere (ammonium, nitrogen, hydrogen sulfide, and the like). For example, when the semiconductor layer 3 is made of oxynitride (for example, TaON) containing transition metal ions having $d^0$-type electron configuration, for example, such as $Ta^{5+}$ and $Ti^{4+}$, a nitrogen-doped semiconductor (for example, $TiO_2$:N), oxysulfide, or the like, a metallic substrate made of simple metal is partially oxidized and then subjected to nitridation or sulfidation treatment or subjected to nitridation or sulfidation treatment and then partially oxidized.

When the semiconductor layer 3 is made of a composite metal semiconductor, a precursor of the composite metal is applied on the metal substrate 2, followed by any one of oxidation, nitridation, and sulfidation, thus producing the semiconductor layer 3.

After the semiconductor layer 3 is produced, the semiconductor layer 3 may be treated by oxidation, hydrogen reduction, or water vapor as an aftertreatment. Such an aftertreatment can reduce or increase lattice defects in the semiconductor layer 3. The increase in lattice defects in the semiconductor layer 3 increases electrical conductivity.

(Hydrogen Production Apparatus)

Figure 4:
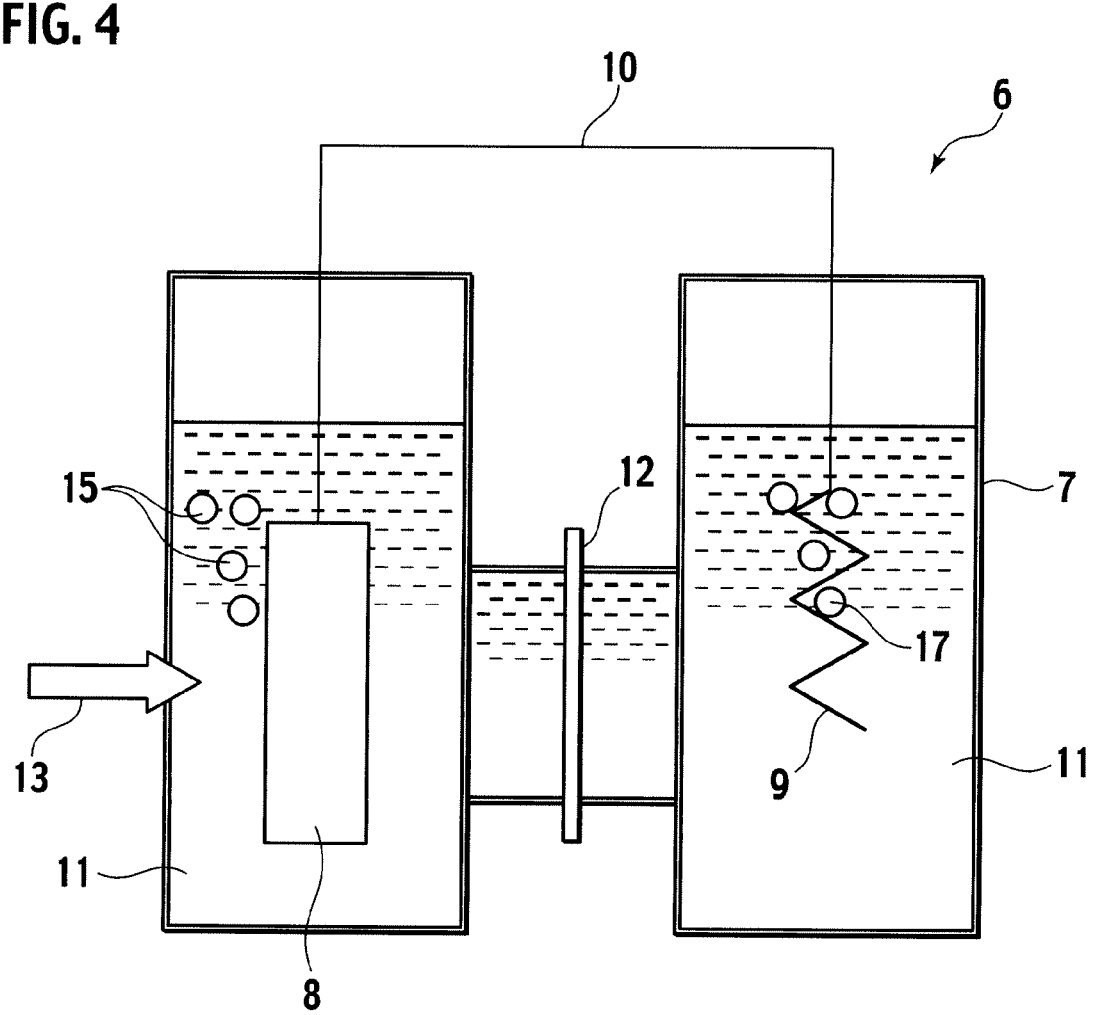
FIG. 4 is a schematic view showing a configuration of a hydrogen production apparatus including the semiconductor photoelectrode according to the embodiment of the present invention.

FIG. 4 shows a configuration of a hydrogen production apparatus 6 including the semiconductor photoelectrode of the present invention. In the hydrogen production apparatus 6, a semiconductor photoelectrode 8 (working electrode) and a counter electrode 9 (for example, a Pt or carbon electrode) are individually arranged in tanks 7. In the middle of the tanks 7 with the semiconductor photoelectrode 8 and counter electrode 9 arranged, an ion exchange membrane 12 is attached. Furthermore, a conductor is connected to the semiconductor photoelectrode 8 and counter electrode 9 to form an outside short-circuit line 10. Moreover, in order to reduce solution resistance in the electrolytic reaction, the tanks 7 store an electrolytic solution 11 (for example, $Na_2SO_4$ aqueous solution) containing a stable supporting electrolyte. In the hydrogen production apparatus 6 of this configuration, the semiconductor photoelectrode 8 is irradiated by sunlight 13 for electrolysis of water.

For the material of the counter electrode 9, a material suitable for the reaction can be selected. To produce hydrogen, a Pt electrode and a carbon electrode which have low overvoltage in producing hydrogen are effective, but a Co—Mo electrode, which is cheap, may be used. The supporting electrolyte can be NaOH, $Na_2SO_4$, $H_2SO_4$, or $Na_2HPO_4$, which are used as an electrolyte in a general electrolytic reaction. The concentration of the supporting electrolyte should be high to reduce the overvoltage of the electrolyte and is preferably not more than 0.01 mol/L. The electrolytic solution 11 may contain a reducing reactant which can be easily decomposed by the photocatalyst (for example, organic substances, hydrogen sulfide, iodine ions). This can increase the photoelectric conversion efficiency. Especially when the metallic substrate includes irregularities like the present invention, a reactive area between a photocatalyst (semiconductor layer) and a reactive substrate is large, and there is little influence of light scattering. Accordingly, the photoelectric conversion efficiency of the photoelectrode is dramatically increased compared to the conventional electrode. A potentiostat or a source meter, which are not shown in FIG. 4, may be provided in the outside short-circuit line 10. The bias potential may be controlled by. Moreover, to check the performance of the electrode or cause a special chemical reaction, an artificial light source (for example, a xenon lamp) may be applied instead of the sunlight 13.

Figure 5:
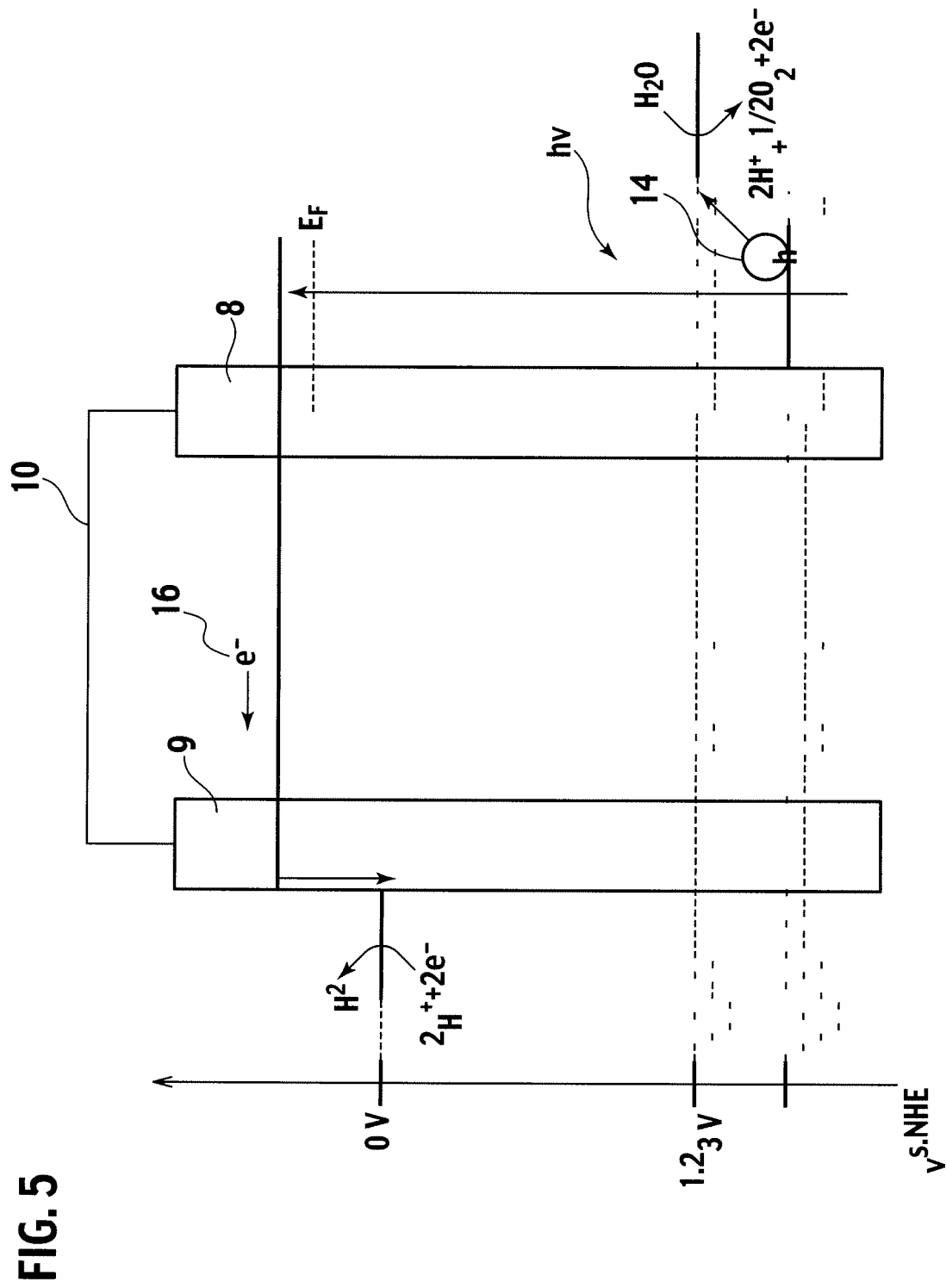
FIG. 5 is a view for explaining an operation principle of splitting water by the hydrogen production apparatus shown in FIG. 4.

Next, with reference to FIG. 5, a description is given of an operation principle of water splitting by the hydrogen production apparatus 6 shown in FIG. 4. When the semiconductor photoelectrode 8 is irradiated by the sunlight 13, as shown in FIG. 5, the semiconductor photoelectrode 8 absorbs the light to produce an electron 16 in a conduction band and produce a hole 14 in a valence band. The hole 14 which has moved to the surface of the semiconductor photoelectrode 8 oxidizes water to produce oxygen 15 by a reaction shown in Formula 1.

$$H_2O \rightarrow 2H^+ + \tfrac{1}{2}O_2 + 2e^-$$ 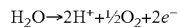 (Formula 1)

On the other hand, the produced electron 16 moves to the metallic substrate 2 in the semiconductor photoelectrode 8 and then moves to the counter electrode 9 through the outside short-circuit line 10. This electron ($e^-$) reduces water on the counter electrode 9 to produce hydrogen 17 by a reaction shown in Formula 2.

$$2H^+ + 2e^- \rightarrow H_2$$ 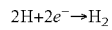 (Formula 2)

Consequently, water is split to produce hydrogen in the semiconductor photoelectrode 8 (working electrode) and oxygen in the counter electrode 9.

The above description is given of an example of the hydrogen production apparatus 6 composed of the semiconductor photoelectrode according to the embodiment of the present invention, but the semiconductor photoelectrode is not limited to the water splitting apparatus and can be applied to a light energy converting device of a die-sensitized solar battery and the like.

Figure 6:
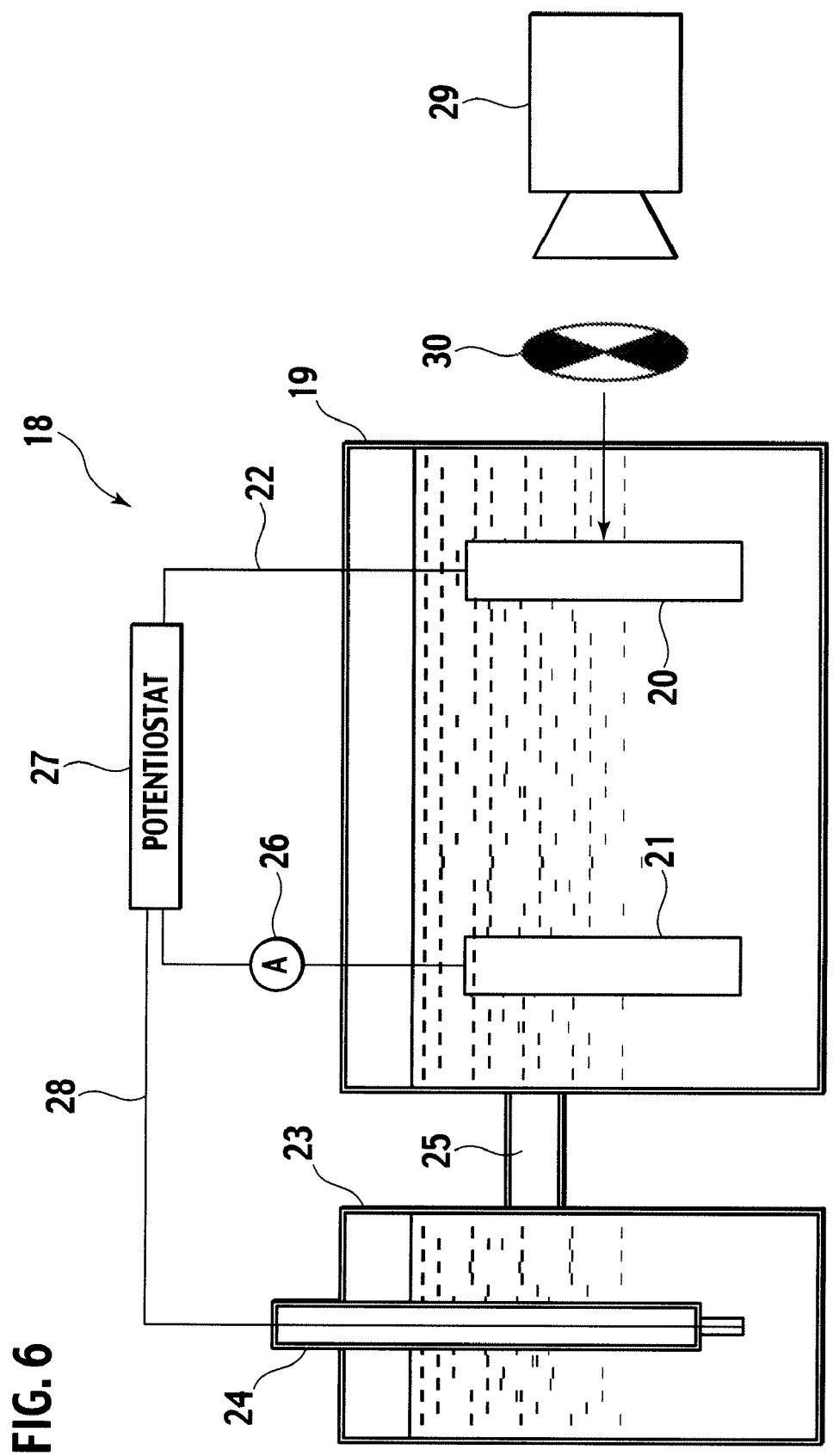
FIG. 6 is a view showing a configuration of an experimental setup of a three-electrode system used for examples and comparative examples.

Hereinafter, a more concrete description is given using examples. In individual examples, experiments were conducted in an experimental setup of a three-electrode system shown in FIG. 6 using semiconductor photoelectrodes with different configurations manufactured by different manufacturing methods. In an experimental setup 18 of a three-electrode system shown in FIG. 6, a semiconductor photoelectrode 20 as the working electrode and a Pt electrode 21 as the counter electrode are arranged in a tank 19. The semiconductor photoelectrode 20 and Pt electrode 21 are connected to an outside short-circuit line 22 to be electrically continued. In a different tank 23, a reference electrode serving as a base electrode for setting and controlling the potential of the working electrode is arranged, and the reference electrode is a silver-silver chloride electrode (Ag—AgCl electrode) 24. The two tanks 19 and 23 are connected by a Vycor glass frit 25 to maintain electrical continuity between the semiconductor photoelectrode 20 and Pt electrode 21. In the outside short-circuit line 22 connecting the semiconductor photoelectrode 20 and Pt electrode 21, an ammeter 26 is provided to measure photocurrent flowing through the circuit. Furthermore, a potentiostat 27 is provided in the outside short-circuit line 22, and the potentiostat 27 and the Ag—AgCl electrode 24 are connected by an outside short-circuit line 28. The potentiostat 27 applies current according to the potential to control the potential difference between the semiconductor photoelectrode 20 and Ag—AgCl electrode 24. The tank 19 stores $Na_2SO_4$ aqueous solution with a concentration of 0.1 mol/L. This $Na_2SO_4$ aqueous solution plays a role of charge transfer in the circuit when there is a potential difference between the semiconductor photoelectrode 20 and Pt electrode 21.

Outside the tank 19, in which the semiconductor photoelectrode 20 is arranged, a xenon lamp (500 W) 29 is arranged, and a chopper 30 is provided between the xenon lamp 29 and semiconductor photoelectrode 20. The chopper 30 switches on and off of light projecting on the semiconductor electrode 20 at regular intervals.

EXAMPLES 1 TO 3

In Examples 1 to 3, as the metallic substrate 2, Ti porous bodies were used, which were produced by heating and pressurizing Ti metallic particles with an average size of 45 μm for necking. The Ti porous bodies had arithmetic average roughnesses (Ra) of about 2 μm and maximum heights (Ry) of about 5 μm.

These Ti porous bodies were heated for one hour in an air atmosphere at different temperatures in a range from 500 to 700° C. The heating temperatures were 500° C. in Example 1, 600° C. in Example 2, and 700° C. in Example 3. The surfaces of the Ti porous bodies were oxidized by the heating to produce $TiO_2$ layers.

Identifying the structure by means of X ray diffraction (XRD) revealed that $TiO_2$ was rutile. As apparent from the result of the cross sectional SEM analysis, the higher heating temperature provided the $TiO_2$ layer with greater thickness. The thicknesses of the $TiO_2$ layers, which varied depending on the location of measurement, were 100 nm in Example 1, 200 nm in Example 2, and 600 μm in Example 3.

COMPARATIVE EXAMPLES 1 TO 3

In Comparative Examples 1 to 3, Ti plates were used instead of the Ti porous bodies used in Examples 1 to 3. The arithmetic average roughnesses (Ra) of the Ti plates were 0.2 to 0.3 μm. Moreover, in the surface of each Ti plate, no large irregularities were formed, and the maximum height (Ry) was less than 1 μm. The semiconductor photoelectrodes were manufactured by a manufacturing method similar to that shown in Examples 1 to 3 except using the Ti plates. The thicknesses of the $TiO_2$ layers, which varied depending on the location of measurement, were 100 nm in Example 1, 200 nm in Example 2, and 600 μm in Example 3.

EXAMPLES 4 AND 5

Figure 7:
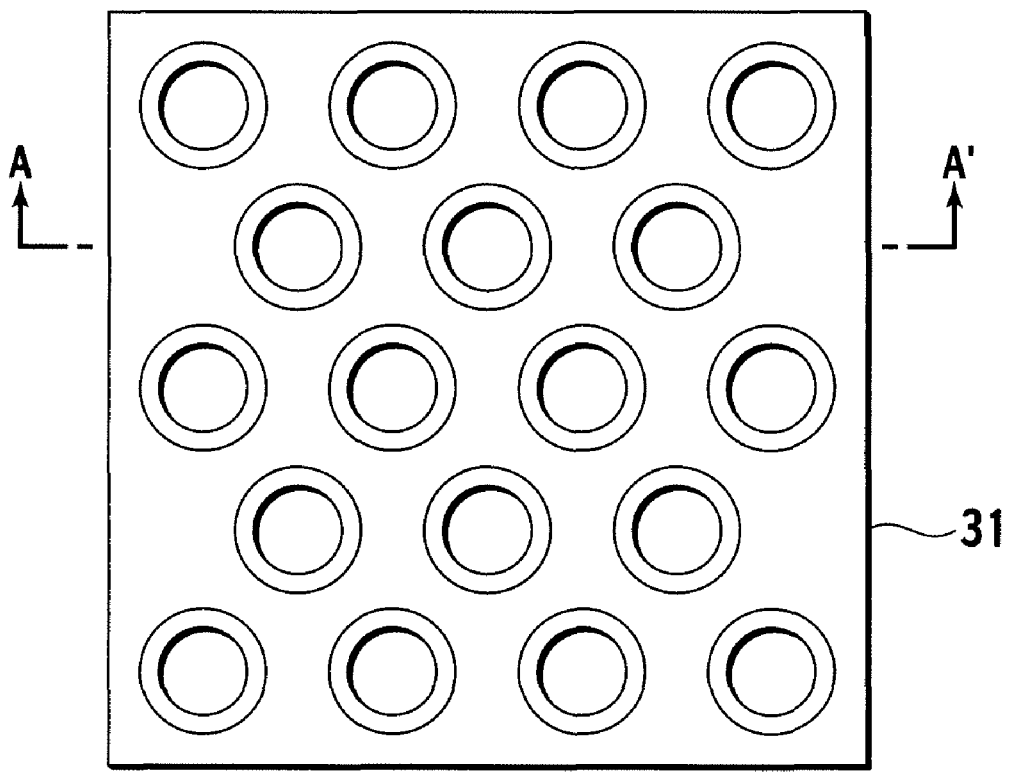
FIGS. 7(a) and 7(b) are views showing a Ti plate used in Examples 4 and 5, FIG. 7(a) being a top view of the Ti plate.
Figure 7:
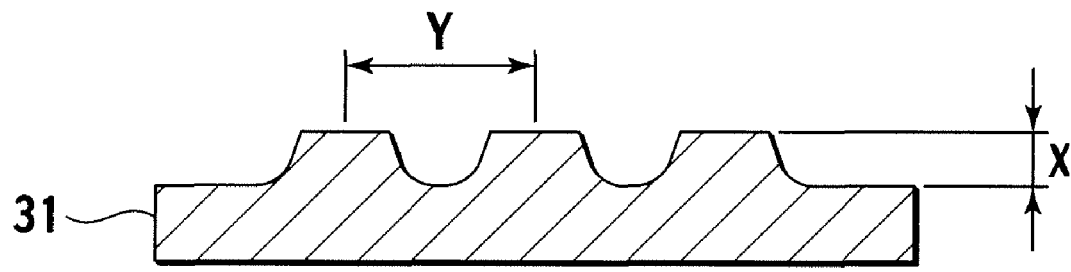

In Examples 4 and 5, as the metallic substrate 2, Ti plates 31 having irregularities in the surfaces were used. The Ti plates were produced by etching Ti plates patterned with a photoresist mask. The surface of each Ti plate was shaped as shown in FIG. 7(a). FIG. 7(b) shows an A-A' cross-sectional view of the surface of the Ti plate shown in FIG. 7(a). In Example 4, X and Y shown in FIG. 7(b) were 5 and 70 μm, respectively. In Example 5, X and Y shown in FIG. 7(b) were 40 and 70 μm, respectively. The arithmetic average roughnesses (Ra) of the Ti plates of Examples 4 and 5 measured 3.0 μm and 3.3 μm, respectively.

Each obtained Ti plate was heated for one hour in an air atmosphere at a temperature of 700° C. for oxidization of the surface of the Ti plate, thus producing the $TiO_2$ layer. The thicknesses of the $TiO_2$ layers of Examples 4 and 5, which varied depending on the location of measurement, were 600 μm.

EXAMPLE 6

In Example 6, first, hydrated colloid of $WO_3$ was prepared. The hydrated colloid of $WO_3$ was prepared by proton exchange for $Na^+$ ions within $Na_2WO_4$ aqueous solution using ion exchange resin. The thus-obtained hydrated colloid aqueous solution was mixed with an equal amount of ethanol and then subjected to vacuum distillation (60° C.), so that the volume thereof was reduced to a quarter. Thereafter, the obtained solution was added with polyethylene glycol 300 (Wako Pure Chemical Industries, Ltd.) as much as half the obtained solution and then mixed using a stirrer, thus obtaining slurry composed of colloidal $WO_3$.

The obtained slurry was applied on the same Ti porous body as that of Example 1 and then heated at 500° C. for one hour, thus producing a $WO_3$ layer on the Ti porous body. The $WO_3$ layer was an aggregate of particles and had irregularities in the surface, but the thickness of the $WO_3$ layer was not uniform and could not be measured.

COMPARATIVE EXAMPLE 4

In Comparative Example 4, the slurry manufactured in Example 6 was applied on the same Ti plate as that of Comparative Example 1 and then heated at 500° C. for one hour, thus producing a $WO_3$ layer on the Ti plate. The $WO_3$ layer was an aggregate of particles and had irregularities in the surface, but the thickness of the $WO_3$ layer was not uniform and could not be measured.

For the semiconductor photoelectrodes of Examples 1 to 6 and Comparative Examples 1 to 4, photocurrent values were measured by a photocurrent measurement experiment. The results of the measurement are shown in Table 1.

TABLE 1

| | Metallic substrate | | | |
| --- | --- | --- | --- | --- |
| | Arithmetic average roughness (Ra) (μm) | Maximum Height (Ry) (μm) | Semiconductor layer Thickness (μm) | Photocurrent Value (μA) |
| Example 1 | 2.0 | 5.0 | 0.1 | 120 |
| Example 2 | 2.0 | 5.0 | 0.2 | 320 |
| Example 3 | 2.0 | 5.0 | 0.6 | 400 |
| Example 4 | 3.0 | 10.0 | 0.6 | 300 |
| Example 5 | 3.3 | 8.8 | 0.6 | 320 |
| Comparative Example 1 | 0.2 to 0.3 | Less than 1 μm | 0.1 | 80 |
| Comparative Example 2 | 0.2 to 0.3 | Less than 1 μm | 0.2 | 95 |
| Comparative Example 3 | 0.2 to 0.3 | Less than 1 μm | 0.6 | 140 |
| Example 6 | 2.0 | 5.0 | — | 550 |
| Comparative Example 4 | 0.2 to 0.3 | Less than 1 μm | — | 310 |

The photocurrent measurement experiment was conducted using a potential sweep method in which the potential of the semiconductor electrode relative to that of the reference electrode was changed at an operation speed of 0.05 V/s. As a result, photocurrent accompanied with water splitting was observed starting from around 0 V based on Ag/AgCl only when the semiconductor photoelectrode was irradiated by light. Hereinafter, the potential is expressed based on Ag/AgCl.

Figure 8:
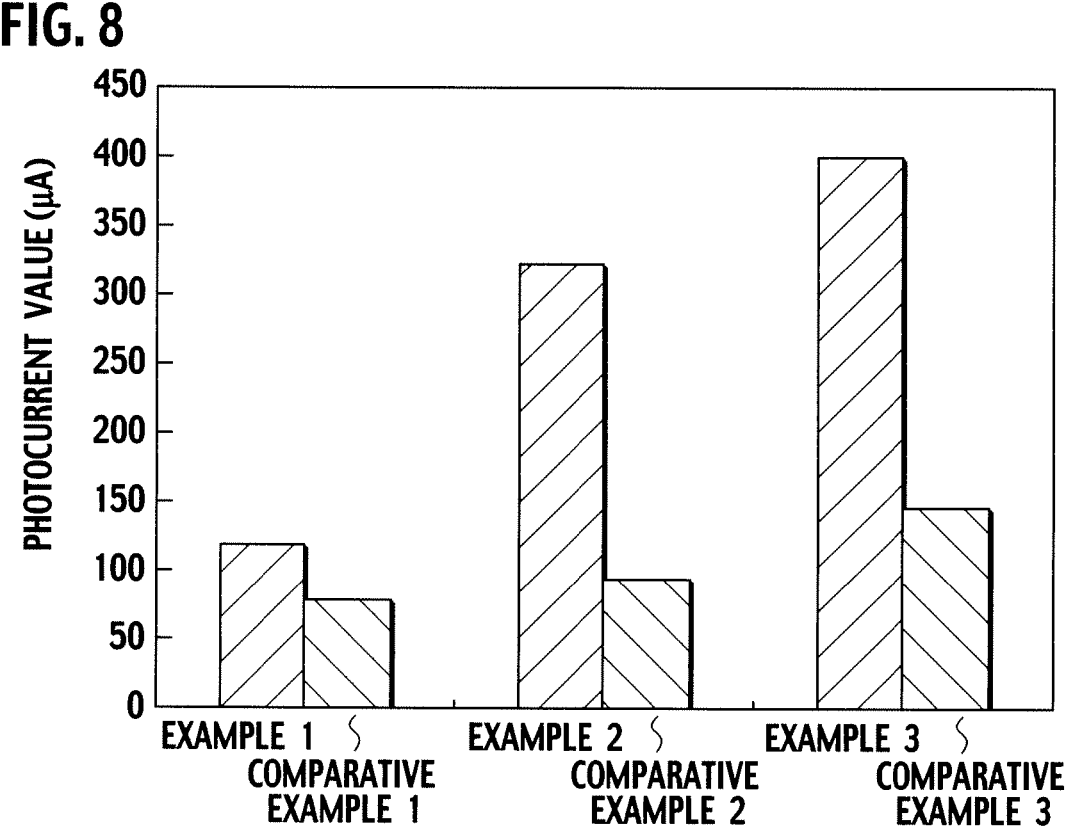
FIG. 8 is a graph showing results of measuring photocurrent values of Examples 1 to 3 and Comparative Examples 1 to 3.

The measurement of the photocurrent values revealed that the photocurrent values gradually increased as the voltage increased. FIG. 8 shows results of measuring the photocurrent values at 0.8 V for Examples 1 to 3 and Comparative Examples 1 to 3. As shown in FIG. 8, it was revealed that, since the thickness of the $TiO_2$ layers was increased along with an increase in heating temperature, the higher heating temperature improved the light absorption characteristics and increased the photocurrent values in both the examples and comparative examples. Comparing the examples and the comparative examples in which heating was conducted at the same temperature, the photocurrent values of the examples were about 1.5 to 3.0 times higher than those of the comparative examples. This is because, compared to Comparative Examples 1 to 3 using the Ti plates, in Examples 1 to 3 using the Ti porous bodies, the semiconductor photoelectrodes had irregularities in the surfaces and therefore could absorb also scattered light. Moreover, another reason is because by increasing the substantial surface area of the semiconductor layer to reduce the charge density in the semiconductor layer, recombination of electric charges can be prevented. Furthermore, it is more advantageous for electrons to move in the metal substrate than to move in the semiconductor layer because the metal substrate has lower resistance than the semiconductor layer has. Accordingly, the increase in area of the metallic substrate could reduce the charge travel distance from the semiconductor layer to the metal substrate.

Figure 9:
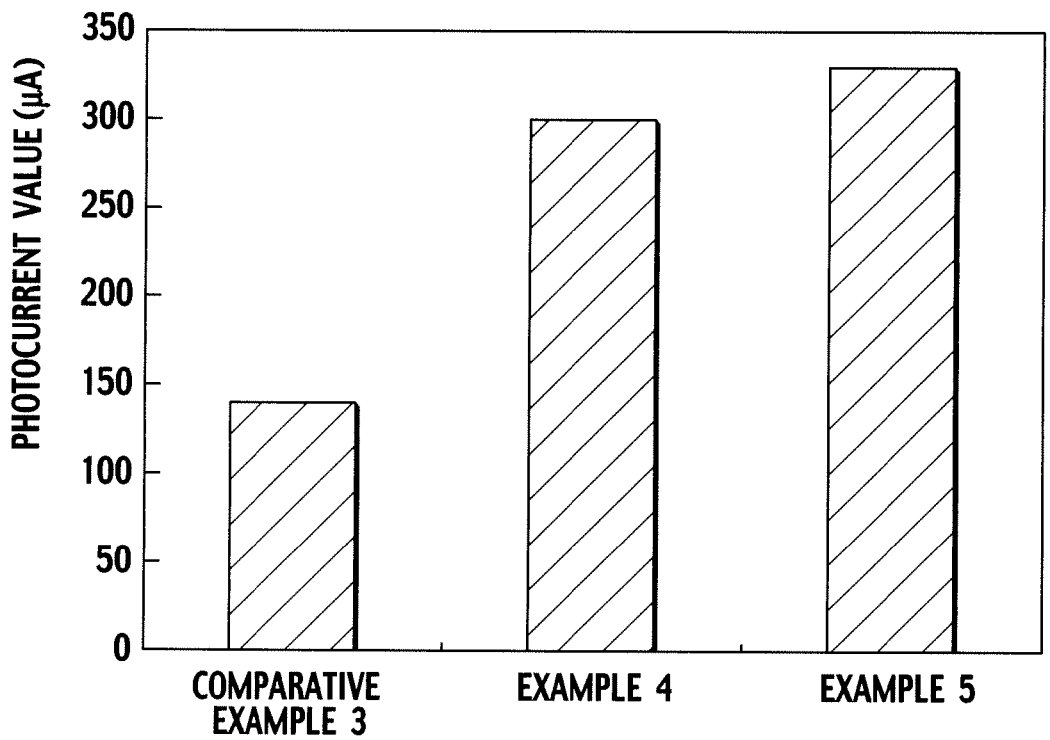
FIG. 9 is a graph showing results of measuring photocurrent values of Examples 4 and 5 and Comparative Example 3.

Next, FIG. 9 shows the results of measuring the photocurrent values of Examples 4 and 5 and Comparative Example 3. As shown in FIG. 9, the photocurrent values of Examples 4 and 5 using the Ti plates having irregularities in the surfaces were increased to twice the photocurrent value of Comparative Example 3 using the Ti plate. Similar to the aforementioned Examples 1 to 3, Examples 4 and 5 showed that providing irregularities for the metallic substrate was effective means.

Figure 10:
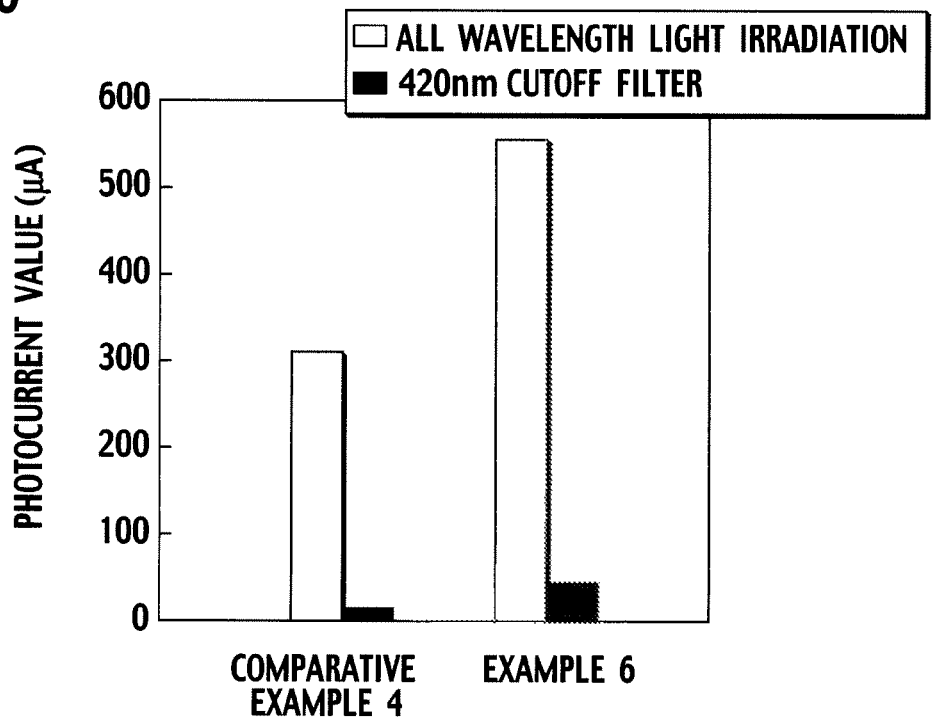
FIG. 10 is a graph showing results of measuring photocurrent values of Example 6 and Comparative Example 4.
Figure 11:
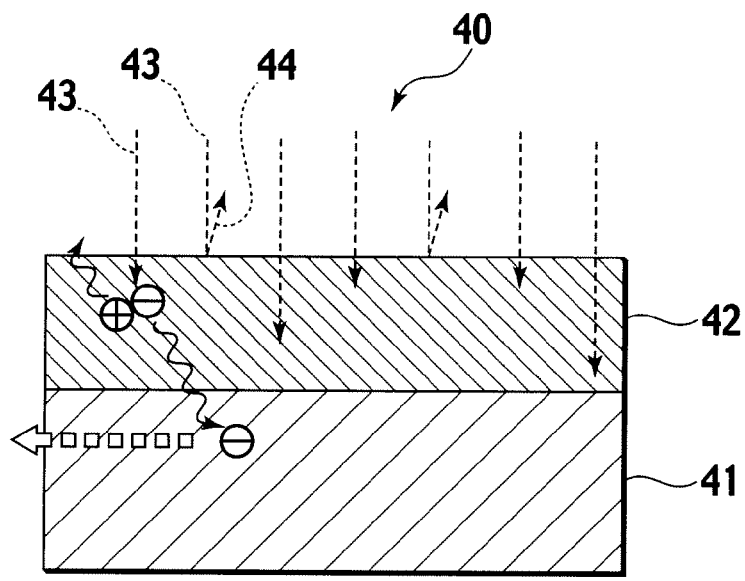
FIG. 11 is an enlarged cross-sectional view showing a conventional semiconductor photoelectrode.

Furthermore, FIG. 10 shows the results of measuring the photocurrent values of Examples 6 and Comparative Example 4. In Example 6 and Comparative Example 4, in order to separately consider only the light absorption characteristics of $WO_3$, the photocurrent values were measured by projecting only light with a wavelength of not less than 420 nm, which was a light absorption wavelength of $WO_3$ but not a light absorption wavelength of $TiO_2$. As shown in FIG. 10, the photocurrent value of Example 6 using the porous body was about 1.8 times that of Comparative Example 4 using the plate, and a significant difference was thus observed between the porous body and plate. This revealed that the fact that the semiconductor photoelectrode having irregularities formed in the surface thereof had better light absorption characteristics than the semiconductor photoelectrode with a flat surface had worked not only in the case of the photoelectrode in which the metal oxide obtained by oxidizing the metallic substrate served as the photocatalyst but also in the case where, on the metallic substrate having irregularities formed thereon, a photocatalyst different from an oxide of the metal of the substrate was produced.

The details of the present invention are described above but are not limited to these configurations and descriptions as long as meet the idea of the present invention. For example, Example 1 used the sintered Ti porous body as the substrate but may use a semiconductor photoelectrode formed by producing the Ti porous body on a plate to form irregularities in the topmost surface. Moreover, in the embodiment of the present invention, the method of supporting the photocatalyst on the metallic substrate was a method in which photocatalyst made into a paste was applied to the metallic substrate and heated but is not limited to this method. The photocatalyst may be supported on the metallic substrate using physical or chemical vapor deposition.

Furthermore in the hydrogen production apparatus 6, there is no device which applies a potential between the semiconductor photoelectrode 8 and counter electrode 9. However, a device for applying voltage may be provided in the outside short-circuit line 10, or the concentration may be biased by setting a difference in pH between the two tanks 7.

In the present invention, an example of the material oxidized by holes is water. However, the oxidized material is not limited to water, and for example, using an electrolyte containing organics such as industrial wastewater, the organics may be oxidized as a sacrificial reagent. Furthermore, in Examples 4 and 5, the method of forming irregularities in the surface is chemical etching, but not limited to this. The irregularities may be formed in the surface by ion etching, the LIGA process, or anodization.

INDUSTRIAL APPLICABILITY

According to the semiconductor photoelectrode of the present invention, the light absorption efficiency can be increased, and recombination of electric charges can be prevented. According to the method for manufacturing the semiconductor photoelectrode of the present invention, it is possible to easily manufacture a semiconductor photoelectrode with a surface area increased by forming irregularities in the surface. According to the light energy converting device of the present invention, the semiconductor photoelectrode in which the light absorption efficiency is increased and recombination of electric charges is prevented is used, so that the photoelectric conversion efficiency can be increased.

The invention claimed is:

1. A semiconductor photoelectrode, comprising:
   a metallic substrate having irregularities in a surface; and
   a semiconductor layer which is formed on the surface of the metallic substrate and made of a photocatalytic material,
   wherein an arithmetic average roughness in the surface of the metallic substrate is in a range from 1 μm to 4 μm, and a spacing between adjacent peaks in the surface of the metallic substrate is not more than 500 μm.

2. The semiconductor photoelectrode according to claim 1, wherein the photocatalytic material contains at least one element selected from the group consisting of Ti, Nb, Ta, W, V, Co, Fe, Ni, and In.

3. The semiconductor photoelectrode according to claim 1, wherein the semiconductor layer has a thickness in a range from 0.1 μm to 1 μm.

4. The semiconductor photoelectrode according to claim 1, wherein the photocatalytic material is different from a compound of metal constituting the metallic substrate.

5. The semiconductor photoelectrode according to claim 1, wherein the metallic substrate is made of a porous body including metallic particles bonded together.

6. The semiconductor photoelectrode according to claim 5, wherein a particle size of the metallic particles is in a range from 1 μm to 400 μm.

7. The semiconductor photoelectrode according to claim 6, wherein the particle size of the metallic particles is in a range from 3 μm to 200 μm.

8. A light energy converting device, comprising:
   the semiconductor photoelectrode according to claim 1.

9. A hydrogen production apparatus, comprising:
   the semiconductor photoelectrode according to claim 1.

10. The semiconductor photoelectrode according to claim 1, wherein a maximum height (Ry) in the surface of the metallic substrate is 1 to 500 μm.

11. The semiconductor photoelectrode according to claim 1, wherein a maximum height (Ry) in the surface of the metallic substrate is 3 to 200 μm.

12. The semiconductor photoelectrode according to claim 1, wherein the arithmetic average roughness in the surface of the metallic substrate is in a range from 2.0 μm to 3.3 μm, and a maximum height (Ry) in the surface of the metallic substrate is 5.0 μm to 10.0 μm.

13. A method for manufacturing a semiconductor photoelectrode, comprising:
   producing a metallic substrate having irregularities in a surface thereof, wherein an arithmetic average roughness in the surface of the metallic substrate is in a range from 1 μm to 4 μm, and a spacing between adjacent peaks in the surface of the metallic substrate is not more than 500 μm; and
   producing a semiconductor layer comprising a photocatalytic material on the surface of the metallic substrate.

14. The method for manufacturing a semiconductor photoelectrode according to claim 13, wherein the metallic substrate is produced by bonding a plurality of metallic particles by pressure or heat.

15. The method for manufacturing a semiconductor photoelectrode according to claim 14, wherein a particle size of the metallic particles is in a range from 1 to 400 μm.

16. The method for manufacturing a semiconductor photoelectrode according to claim 15, wherein the particle size of the metallic particles is in a range from 3 to 200 μm.

17. The method for manufacturing a semiconductor photoelectrode according to claim 13, wherein the irregularities in the surface of the metallic substrate are provided by rough grinding or chemical etching.

18. The method for manufacturing a semiconductor photoelectrode according to claim 13, wherein the semiconductor layer is produced by conducting chemical reaction of the metallic substrate and gas.

19. The method for manufacturing a semiconductor photoelectrode according to claim 18, wherein the chemical reaction is any one of oxidation, nitridation, and sulfidation.

20. The method for manufacturing a semiconductor photoelectrode according to claim 13, wherein the semiconductor layer is produced by applying slurry containing the photocatalytic material to the surface of the metallic substrate, followed by heating.

* * * * *